July 10, 1951 R. B. JOHNSON 2,559,627
MARK TESTER
Filed March 12, 1948
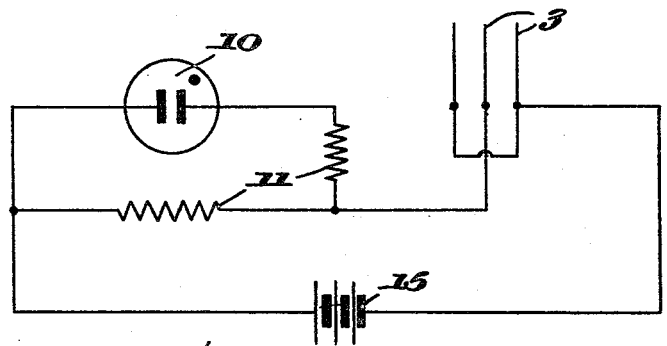
FIG. 4
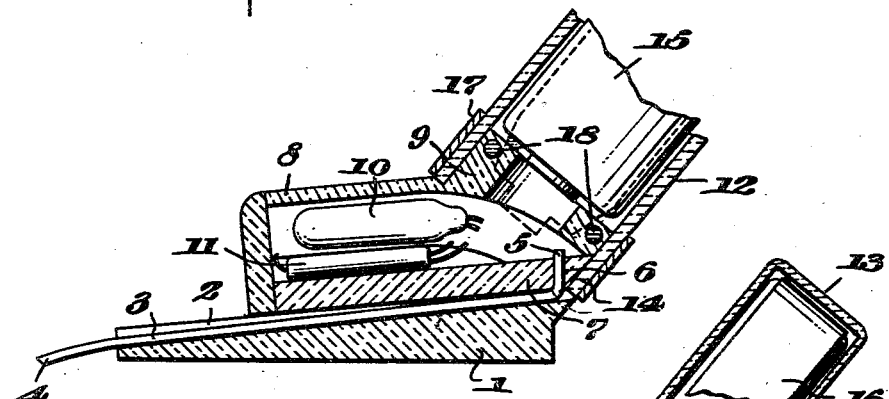
FIG. 3
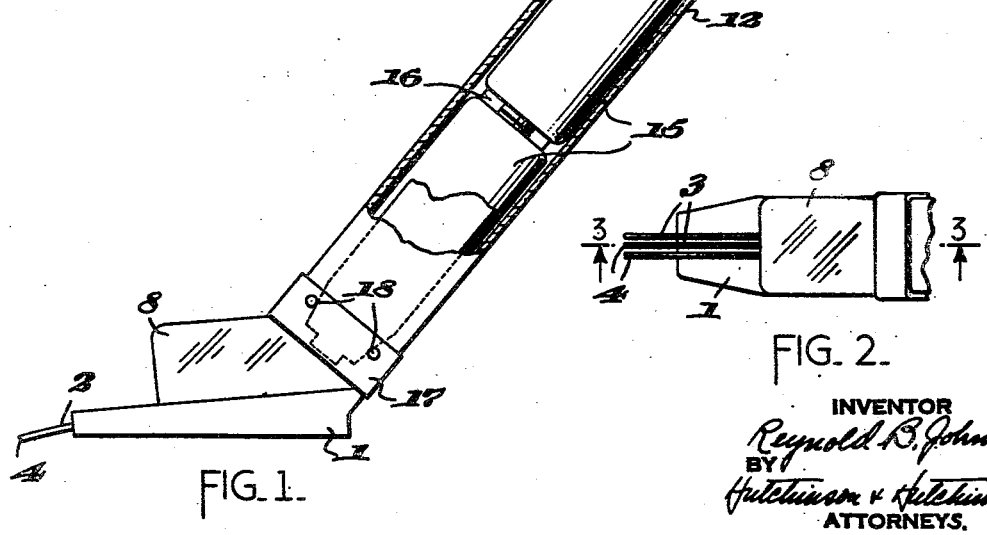
FIG. 2
FIG. 1
INVENTOR
Reynold B. Johnson
BY
Hutchinson & Hutchinson
ATTORNEYS.

Patented July 10, 1951

2,559,627

UNITED STATES PATENT OFFICE 2,559,627

MARK TESTER

Reynold B. Johnson, Binghamton, N. Y., assignor to International Business Machines Corporation, New York, N. Y., a corporation of New York Application March 12, 1948, Serial No. 14,470

8 Claims. (Cl. 175—183)

This invention relates to an improved form of mark testing device adapted to be used for testing the efficacy of marks used in mark sensed records.

An object of the invention is to provide an improved form of mark testing device of a portable nature which may be readily carried to the mark sensed records for testing purposes, whereby the efficacy of the marks may be tested to an accurate degree as the mark tester is placed upon the record and drawn over the mark or marks to be tested.

Another object of the invention is to provide an improved portable self-contained mark tester for testing the efficacy of marks used in mark sensed records, said mark tester including a plurality of sensing wires or fingers connected in electrical circuits with a neon tube, a pair of resistors and a self-contained source of electric current supply, together with means for controlling the pressure exerted on the sensing wires or fingers as they move over a record and the mark thereon which is being tested.

A further object of the invention is to provide an improved mark tester for testing the efficacy of marks used in mark sensed records, said mark tester including a neon tube, a source of electric current supply, interchangeable resistors having various values, a plurality of sensing wires or fingers, and electric circuits connecting the same together for proper operation.

Other objects will appear as the description proceeds.

In the accompanying drawings which form a part of this application,

Figure 1 is a side elevation of the improved mark tester, with portions thereof being broken away and in section to show the interior construction thereof;

Figure 2 is a plan view of the lower portion of the mark tester;

Fig. 3 is an enlarged sectional view taken on the line 3—3 of Figure 2; and

Figure 4 is a diagrammatic view of the several electrical devices contained in the mark tester with their electric circuits.

Like characters of reference are used throughout the following specification and the accompanying drawings to designate corresponding parts.

In carrying out the invention, there is provided an improved form of mark testing device to be used for testing the efficacy of marks used in mark sensed records, said device including a base block 1 of insulating material adapted to be laid flat upon the record sheet (not shown) when in operation. A plurality of spaced longitudinally extending grooves 2 will be formed in the upper surface of the base block 1, and the three sensing wires or fingers 3 will be disposed within said slots with their outer ends 4 being slightly curved in a downward direction, extending slightly below the lower surface of the base block 1. The rear or inner ends 5 of the sensing wires 3 will extend upwardly at right angles to be supported in apertures 6 formed through the bottom 7 of a transparent casing 8, which will be disposed upon the upper surface of the base block 1.

Preferably the grooves 2 are formed of gradually increasing depth from a depth barely capable of accommodating the wires or fingers 3 at their inner fixed end 6 to a considerably greater depth at the opposite or outer end, as will be seen in Fig. 3 of the drawings. As a result of the manner of mounting the wires and the curvature given to said wires, it will be appreciated that the same will normally be tensioned against the bottom of the grooves. However, during a testing operation when the base block 1 is laid flat on the record sheet and pressure is applied thereto by the operator, the wires or fingers 3 will be moved, or rather pivoted, upwardly in the grooves 2 until they contact the bottom surface 7 of the casing 8 thereby limiting further upward movement of the wires and controlling the pressure that the wires can exert on the record sheet thus keeping said pressure uniform throughout a plurality of testing operations.

The casing 8 will be substantially rectangular in shape and will be formed with an upwardly extending angularly disposed collar portion 9.

Suitably mounted within the transparent casing 8, is a neon tube 10, and two resistors 11 which will be connected in electrical circuits hereinafter more fully described.

A tubular combination handle and battery supporting body 12 of insulating material having a closed outer end 13 and an open inner or lower end 14 will be disposed about the collar portion 9 of the transparent casing 8, and will house a plurality of interconnected electric batteries 15.

A U-shaped metallic contact strip 16 will be disposed longitudinally within the battery supporting body 12 between the inner wall of said body and said batteries 15.

A metal reinforcing and supporting band 17 will be positioned about the inner end of the battery supporting body 12 and will be secured in position by means of the oppositely disposed screw fasteners 18, which extend through the band 17, the body 12 and the collar portion 9 on the transparent casing 8.

From the diagrammatic sketch shown in Figure 4, it will be seen that the middle of the sensing wires or fingers 3 is electrically connected with one end of each of the resistors 11, and that the opposite ends of said resistors 11 are electrically connected to the neon tube 10, and an electrical connection is made between the resistors 11 and the strip 16 connected with one side of the batteries 15. The outermost sensing wires will be connected together and to the opposite side of the batteries 15, whereby when the base block 1 is placed flat upon a record sheet (not shown) and pressure is exerted upon the mark tester device, the sensing wires or fingers 3 will move upwardly in their supporting grooves 2 until they engage the bottom 7 of the transparent casing 8, thereby controlling the pressure that the wires or fingers 3 can exert on the record sheet (not shown). Since the pressure upon the wires or fingers 3 is uniform at all times, uniform results will be had in testing.

In operation, the base block 1 is laid flat on the record to be tested and the sensing wires or fingers 3 are drawn across the mark to be tested. It is essential that the middle wire and one of the end wires on the opposite sides thereof simultaneously contact or rest upon the mark being tested. If the carbon deposit of the mark is sufficient to form a conductive path between the middle wire and the wire on either side thereof, a circuit will be completed from the battery through the outside wire, the carbon deposit, the middle wire, through the resistors, the neon tube and back to the battery, thereby causing the neon tube to be illuminated and indicating that the mark being tested is a good mark.

If the carbon deposit of the mark is insufficient to complete the above outlined circuit, the neon tube will not light, showing that the mark being tested is inferior.

It will be understood that the testing capacity of the device may be varied by changing the resistors in the circuit for those of different values, and in consequence, the device may be adapted to test marks of various qualities.

While the preferred embodiment of the instant invention has been illustrated and described, it will be understood that it is not intended to limit the scope of the invention thereto, as many minor changes in detail of construction may be resorted to without departure from the spirit of the invention as set forth in the appended claims.

Having thus described my invention, what I claim as new and desire to secure by Letters Patent of the United States is:

1. A mark testing device comprising a base block provided with a plurality of parallel grooves, sensing wires movably supported in said grooves, one end of said wires being fixed in said block while the other end of said wires extends beyond said block in a downwardly curved direction to a point below the plane of the bottom of said block and is free to be flexed upwardly on contact with a surface to be tested when said base block engages a test surface, electric indicating means carried by said block and a source of electric current supply connected between said sensing wires and said electric indicating means, whereby said electric indicating means will be actuated when the circuit is closed by placing the sensing wires simultaneously upon a mark to be tested.

2. The subject matter as claimed in claim 1 including means for limiting the upward movement of the sensing wires in said grooves during the testing operation, whereby a uniform contact pressure is obtained throughout a plurality of testing operations.

3. A mark testing device comprising a base block provided with a plurality of longitudinally extending parallel grooves, a casing supported by said base block, sensing wires movably carried in said grooves and anchored at one end to said casing with their free ends extending beyond said base block and curved downwardly below the plane of the bottom of said base block, electric indicating means and resistors housed in said casing, a hollow handle member supported by said casing; batteries in said member, and electrical connections between said sensing wires, indicating means, resistors and batteries constituting a normally open circuit being closable when said base block is laid flat against a surface and said sensing wires simultaneously contact a mark being tested, thereby actuating said indicating means and indicating a satisfactory mark.

4. The subject matter as claimed in claim 3 wherein said casing limits the upward movement of the sensing wires in said grooves during the testing operation, whereby a uniform contact pressure is obtained throughout a plurality of testing operations.

5. A mark testing device comprising a base block provided with a plurality of longitudinally extending grooves of gradually increasing depth from one end of said block to the other, resilient sensing elements movably carried in said grooves with the ends of the elements lying in the shallow end of the grooves fixed to said block and the other ends of said elements extending beyond said block and flexed downwardly to a point below the plane of the bottom of said block, whereby said elements are free to be flexed upwardly on contact with a surface to be tested when said base block engages said surface, electric indicating means, a source of electric current supply connected between said sensing elements and said electric indicating means constituting a normally open circuit being closable when said base block is laid flat against a surface and said sensing elements simultaneously contact a mark to be tested, thereby actuating said indicating means and indicating a satisfactory mark.

6. The subject matter as claimed in claim 5 including means for limiting the upward movement of the sensing elements in the grooves during a testing operation, whereby a uniform contact pressure is obtained throughout a plurality of testing operations.

7. A mark testing device comprising a base block, wire receiving and retaining means carried by said base block, resilient sensing wires movably supported in said last mentioned means, the inner ends only of said wires being anchored therein while the other ends extend beyond said block to a point below the plane of the bottom of said block and thus being free to be flexed upwardly on contact with a surface to be tested when said base block engages such a surface, electric indicating means, and a source of electric current supply connected between said sensing wires and said electric indicating means constituting a normally open circuit being closable when said base block is laid flat against a surface and said sensing elements simultaneously contact a mark to be tested, thereby actuating said indicating means and indicating a satisfactory mark.

8. The subject-matter as claimed in claim 7 including means for limiting the upward movement of the sensing wires in said wire receiving and retaining means during a testing operation, whereby a uniform contact pressure is obtained throughout a plurality of testing operations.

REYNOLD B. JOHNSON.

REFERENCES CITED

The following references are of record in the file of this patent:

UNITED STATES PATENTS

| Number | Name | Date |
| --- | --- | --- |
| 1,610,563 | McIlvaine | Dec. 14, 1926 |
| 1,875,359 | Suits et al. | Sept. 6, 1932 |
| 1,915,028 | Jagenberg | June 20, 1933 |
| 1,971,481 | Erickson | Aug. 28, 1934 |
| 1,996,063 | Corkran | Apr. 2, 1935 |
| 2,328,853 | Sherrard | Sept. 7, 1943 |
| 2,399,018 | Greenslade | Apr. 23, 1946 |
| 2,423,552 | Clarke | July 8, 1947 |